United States Patent
Nakamura et al.

(10) Patent No.: US 8,233,179 B2
(45) Date of Patent: Jul. 31, 2012

(54) PRINT MANAGEMENT SYSTEM INCLUDING MANAGEMENT OF STORAGE STATUS OF PRINT DATA

(75) Inventors: Yoshio Nakamura, Saitama (JP); Akito Umebayashi, Kanagawa (JP); Shougo Kimura, Tochigi (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 12/346,990

(22) Filed: Dec. 31, 2008

(65) Prior Publication Data

US 2009/0190166 A1 Jul. 30, 2009

(30) Foreign Application Priority Data

Jan. 28, 2008 (JP) .................. 2008-016167

(51) Int. Cl.
 *G06F 15/00* (2006.01)
 *G06F 3/12* (2006.01)
 *G06K 1/00* (2006.01)
 *G06K 15/00* (2006.01)

(52) U.S. Cl. ...................... 358/1.15; 358/1.14
(58) Field of Classification Search .............. None
See application file for complete search history.

(56) References Cited

U.S. PATENT DOCUMENTS

| | | | |
|---|---|---|---|
| 6,396,592 B1 | 5/2002 | Okada et al. | |
| 6,597,469 B1 * | 7/2003 | Kuroyanagi | 358/1.15 |
| 2002/0030851 A1 * | 3/2002 | Wanda | 358/1.15 |
| 2003/0090716 A1 | 5/2003 | Umebayashi et al. | |
| 2003/0107761 A1 | 6/2003 | Kimura | |
| 2005/0099651 A1 | 5/2005 | Kimura et al. | |
| 2006/0221367 A1 | 10/2006 | Shiokawa | |
| 2007/0242301 A1 | 10/2007 | Tsuchie et al. | |
| 2011/0069338 A1 * | 3/2011 | Uchikawa et al. | 358/1.14 |

FOREIGN PATENT DOCUMENTS

| | | |
|---|---|---|
| JP | 11-165446 | 6/1999 |
| JP | 2000-181653 | 6/2000 |
| JP | 2005-297257 | 10/2005 |
| JP | 2006-099714 A | 4/2006 |
| JP | 2006-350497 | 12/2006 |
| JP | 2007-011506 | 1/2007 |
| JP | 2007-179197 | 7/2007 |
| JP | 2007-208823 | 8/2007 |

OTHER PUBLICATIONS

Japan Office action, mail date is Jan. 17, 2012.

* cited by examiner

*Primary Examiner* — Douglas Tran
(74) *Attorney, Agent, or Firm* — Greenblum & Bernstein, P.L.C.

(57) ABSTRACT

In a print processing system, a storage server temporarily stores print data generated on a user client PC; a multifunction apparatus then obtains the print data from the storage server and prints the data, according to user's operation on the multifunction apparatus; and a management server manages a storage status of the print data on the storage server. The user client PC transmits to the storage server, bibliographic information associated with the print data concurrently when transmitting the data. The storage server stores thereon the print data obtained from the user client PC and transfers to the management server, the bibliographic information obtained from the user client PC. The management server manages the storage status of the print data on the storage server, based on the bibliographic information obtained from the storage server.

14 Claims, 16 Drawing Sheets

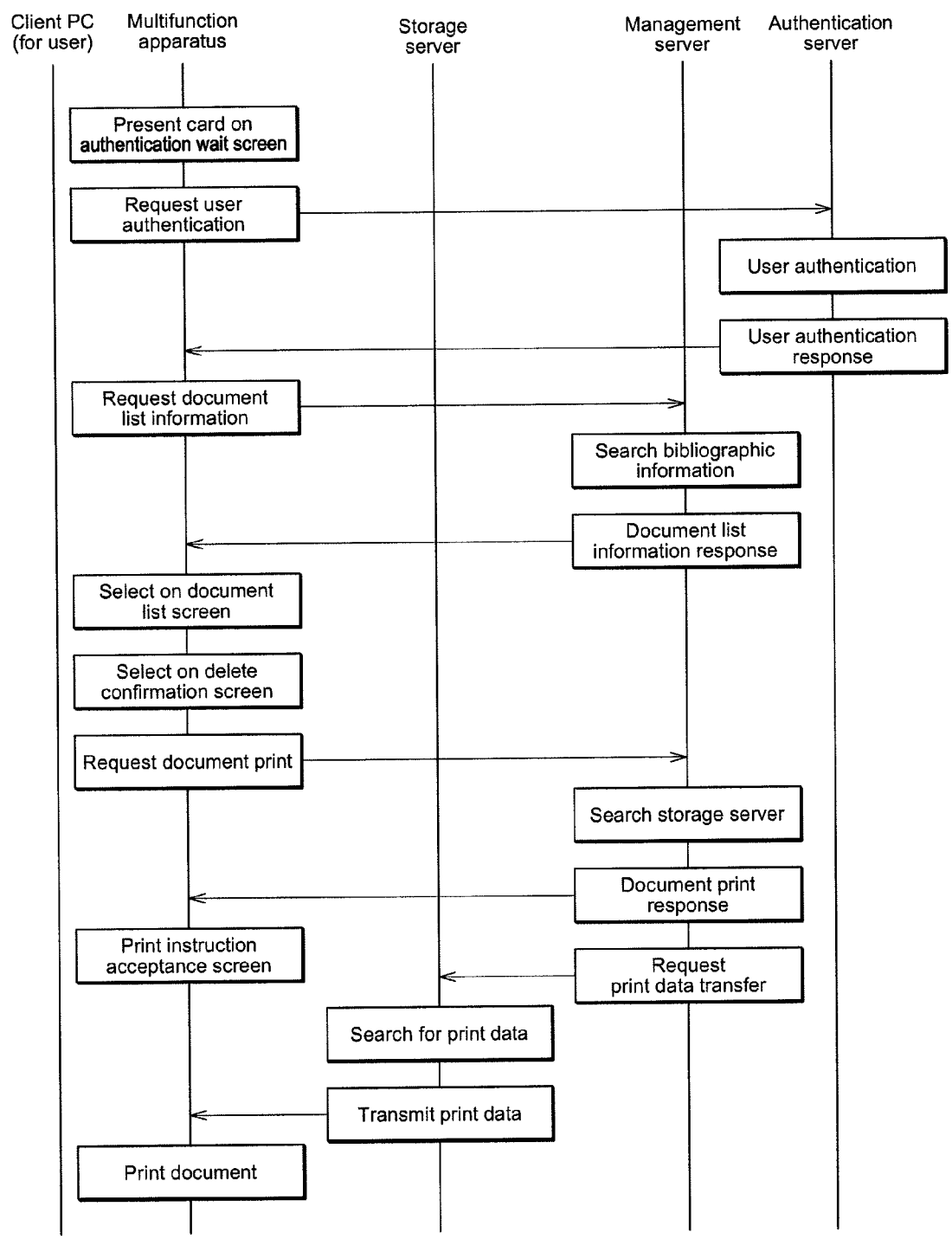

PRINT MANAGEMENT SYSTEM INCLUDING MANAGEMENT OF STORAGE STATUS OF PRINT DATA

CROSS-REFERENCE TO RELATED APPLICATIONS

The present application claims priority under 35, U.S.C. §119, of Japanese Application No. 2008-016167, filed on Jan. 28, 2008, the disclosure of which is expressly incorporated by reference herein in its entirety.

BACKGROUND OF THE INVENTION

1. Field of the Invention

The present invention relates to a print processing system.

2. Description of Related Art

Recently a network printing system has widely been used at the office. In such a network printing system, terminal apparatuses (PCs) for users and a printing apparatus (multi-function apparatus and the like) are connected to a network, so as to share the printing apparatus among a plurality of users. Particularly for purposes of saving expenses and ensuring the security of printed documents, a print processing system employing a storage printing system is known. In the print processing system, print data generated on a user's PC is temporarily stored on a storage server (print server), and, only when user authentication is successful on a printing apparatus, the printing apparatus obtains the print data designated by a user from the storage server and prints the data (refer to Related Art 1, for example).

This type of print processing system requires a function to manage use of the printing apparatus per user. Further, when it is difficult to perform processing on one storage server due to a large number of users, a management server needs to be installed separately from the storage server, in order to divide and store print data on a plurality of storage servers and to manage the storage status of the print data on the servers.

[Related Art 1] Japanese Patent Laid-open Publication No. 2006-99714

In the conventional technology disclosed in above-described Related Art 1, while the print data is transmitted from the user terminal apparatus to the storage server, data containing bibliographic information required for managing the print data is transmitted from the user terminal apparatus to the print management server. Therefore, the user terminal apparatus is required to have a data transmitter that transmits the data to two servers, namely the storage server and the management server. Thus, the technology has a problem where a configuration of the user terminal apparatus is complex. In addition, since the print data and data containing bibliographic information are separately transmitted, data consistency needs to be verified between the two servers, so that no discrepancy occurs between the data stored on the storage server and data managed on the management server. Thus, the technology also has problems, such as complicated processes and the like.

Furthermore, when the bibliographic information associated with the print data is not transmitted to the storage server, the storage server cannot restrict use of a user who has transmitted the print data. The storage server thus stores the print data indefinitely. When a large amount of print data is transmitted with malicious intent or by erroneous operation, the storage server may easily overflow, thus possibly leading to a situation where printing cannot be performed.

SUMMARY OF THE INVENTION

The present invention is provided to address the above-described problems in the conventional technology. An object of the present invention is to simplify a configuration of a user terminal apparatus and processes on two servers for storing and managing print data respectively, in a print processing system employing a storage printing system. Further, the present invention is also intended to avoid storage server overflow when unlimited transmission of print data occurs.

In a print processing system according to the present invention, a storage server temporarily stores print data generated on a terminal apparatus of each user; a printing apparatus then obtains the print data from the storage server and prints the data, according to user's operation on the printing apparatus; and a management server manages a storage status of the print data on the storage server. In the print processing system, the terminal apparatus transmits to the storage server, bibliographic information associated with the print data concurrently when transmitting the data; the storage server stores thereon the print data obtained from the terminal apparatus and transfers to the management server, the bibliographic information obtained from the terminal apparatus; and the management server manages the storage status of the print data on the storage server, based on the bibliographic information obtained from the storage server.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 is a sequence diagram illustrating a processing procedure from print instruction to print end on the multifunction apparatus of the print processing system shown in FIG. 1;

DETAILED DESCRIPTION OF PREFERRED EMBODIMENTS

Figure 1:
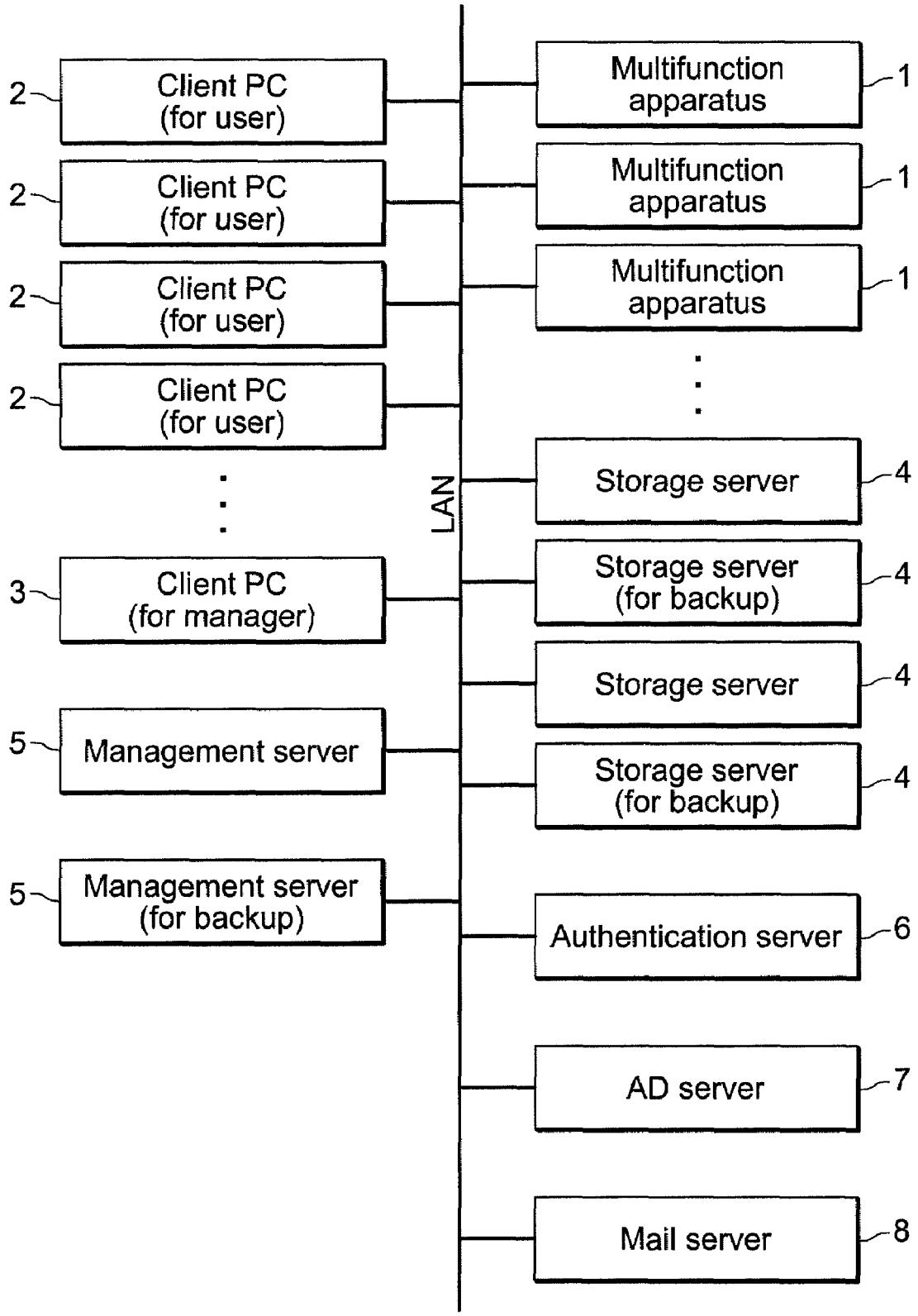
FIG. 1 is a system configuration diagram of a print processing system according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A first aspect of the present invention provides a print processing system in which a storage server temporarily stores print data generated on a terminal apparatus of each user; a printing apparatus then obtains the print data from the storage server and prints the data, according to user's operation on the printing apparatus; and a management server manages a storage status of the print data on the storage server. In the print processing system, the terminal apparatus transmits to the storage server, bibliographic information associated with the print data concurrently when transmitting the data; the storage server stores thereon the print data obtained from the terminal apparatus and transfers to the management server, the bibliographic information obtained from the terminal apparatus; and the management server manages the storage status of the print data on the storage server, based on the bibliographic information obtained from the storage server.

In the system above, the user terminal apparatus only needs to transmit the bibliographic information to the storage server, concurrently with the print data. Thus, a configuration of the user terminal apparatus can be simplified. In addition, since the bibliographic information is transmitted to the management server via the storage server, data consistency needs not to be verified between the storage server and the management server. Thus, processes between the storage server and the management server can be simplified.

The bibliographic information herein includes attribute information, such as, for example, user identification information, a document name, date and time, and identification information of a user terminal apparatus. The print data can be managed based on the bibliographic information.

A second aspect of the present invention provides the print processing system according to the first aspect of the present invention, wherein the terminal apparatus generates the print data, in which the bibliographic information is added to actual print data, and transmits the print data to the storage server; and the storage server extracts the bibliographic information from the print data obtained from the terminal apparatus and transfers the bibliographic information to the management server.

In the system above, only the print data needs to be transmitted from the user terminal apparatus to the storage server, and thus a transmission process on the terminal apparatus can be simplified.

The actual print data herein indicates specific contents of a document written in a page description language interpretable by the printing apparatus. The printing apparatus prints the document based on the actual print data. The bibliographic information is described in a command language for printing (e.g., PJL or Printer Job Language) and is incorporated into the print data. The print data is deciphered so as to extract the bibliographic information.

To communicate the print data between the user terminal apparatus and the storage server, a standard communicator (e.g., standard TCP/IP port (Port9100)) can be used. To transfer the bibliographic information between the storage server and the management server, a general communicator (e.g., SOAP) can be used for requesting a predetermined process to a device connected to a network and for receiving a response.

A third aspect of the present invention provides the print processing system according to the first or second aspect of the present invention, wherein the storage server transfers identification information thereof to the management server, concurrently with the bibliographic information obtained from the terminal apparatus.

The system above can easily and accurately identify the storage server storing the print data associated with the bibliographic information.

A fourth aspect of the present invention provides the print processing system according to the first to third aspects of the present invention, wherein the printing apparatus obtains user identification information from a user providing a print instruction and inquires the management server for a document associated with the user; and the management server searches for a document associated with the user, based on the user identification information obtained from the printing apparatus, and provides the printing apparatus with associated document list information in return.

The system above can display on the printing apparatus, a list of documents associated with the user, thus allowing the user to easily designate a document for printing.

A fifth aspect of the present invention provides the print processing system according to the first to fourth aspects of the present invention, wherein the printing apparatus provides the management server with a print request associated with a designated document, according to a print instruction that a user provides by designating a document; the management server, in response to the print request from the printing apparatus, provides the storage server storing the print data associated with the designated document, with a transfer request of the print data to the printing apparatus providing the print request; and the storage server, in response to the transfer request from the management server, transfers the print data to the printing apparatus providing the print request.

In the system above, the printing apparatus only needs to provide a print request to the management server, and thus a process in the printing apparatus can be simplified. In addition, since a print instruction is transmitted to the storage server via the management server, a discrepancy can be prevented from occurring between the data stored on the storage server and the data managed on the management server.

A sixth aspect of the present invention provides the print processing system according to the first to fifth aspects of the present invention, wherein the storage server causes a user authenticator to perform user authentication, based on user information included in the bibliographic information obtained from the terminal apparatus; and, only when the user authentication is successful, the storage server stores the print data.

In the system above, the user authentication verifies whether or not a user transmitting the print data is a proper user permitted to perform printing. When the user is not a proper user, storage of the print data is rejected, thereby preventing unauthorized use. When a large amount of print data is transmitted with malicious intent, a situation can be prevented where the storage server overflows and thus printing cannot be performed.

The user authenticator herein may be provided as an independent authentication server. Alternatively, a user authenticator provided in the printing apparatus for limiting use thereof may be used.

A seventh aspect of the present invention provides the print processing system according to the sixth aspect of the present invention, wherein the storage server rejects storage of new print data, in a case where a threshold associated with print data storage set per user is exceeded when the new print data is transmitted from the printing apparatus.

In the system above, in a case where a capacity assigned to a user is exceeded, storage of print data is rejected even when the user transmitting the print data is a proper user permitted to perform printing. Thus, when a large amount of print data is transmitted due to an erroneous operation or the like by a certain user, a situation can be prevented where the storage server overflows and thus printing cannot be performed.

An eighth aspect of the present invention provides a print processing system in which a storage server temporarily stores print data generated on a terminal apparatus of each user; a printing apparatus then obtains the print data from the storage server and prints the data, according to user's operation on the printing apparatus; and a management server manages a storage status of the print data on the storage server. In the print processing system, the printing apparatus provides the management server with a delete request associated with a designated document, according to a delete instruction that a user provides by designating a document; the management server, in response to the delete request from the printing apparatus, provides a delete request of the associated print data, to the storage server storing the print data associated with the designated document; and the storage server, in response to the delete request from the management server, deletes the associated print data from a print data storage of the storage server.

In the system above, the printing apparatus only needs to provide a delete request to the management server, and thus a process in the printing apparatus can be simplified. In addition, since a delete instruction is transmitted to the storage server via the management server, a discrepancy can be prevented from occurring between the data stored on the storage server and the data managed on the management server.

A ninth aspect of the present invention provides the print processing system according to the first to eighth aspects of the present invention, wherein the management server retains delete instruction information per document relating to whether or not to delete the print data after printing; and, upon completion of printing of a document to which a delete instruction is provided, the management server provides a delete request of the associated print data, to the storage server storing the print data associated with the document; and the storage server, in response to the delete request from the management server, deletes the associated print data from the print data storage of the storage server.

The system allows selection of whether or not to delete the print data after printing, thus improving usability.

A user or a manager designates whether or not to delete the print data after printing. In a case where a user designates deletion, for example, the system may be configured, such that the printing apparatus inquires the user whether or not the print data is deleted after printing, when the user provides a print instruction or the like, and then the obtained delete designation information is transmitted to the management server. The system may also be configured, such that a user enters whether or not the print data is deleted after printing on the terminal apparatus, and then the obtained delete designation information is transmitted to the management server.

A tenth aspect of the present invention provides the print processing system according to the eighth or ninth aspect of the present invention, wherein, when the management server receives a notification of print data delete completion from the storage server, the management server deletes the bibliographic information associated with the deleted print data from a bibliographic information storage of the management server.

The system above can ensure that a discrepancy is prevented from occurring between the data stored on the storage server and the data managed on the management server.

An eleventh aspect of the present invention provides the print processing system according to the first to tenth aspects of the present invention, wherein, when the storage server detects an error in a process where the print data transmitted from the terminal apparatus is being stored, the storage server deletes the associated print data and provides an error notification to the terminal apparatus transmitting the data.

The system above can promptly notify a user that printing cannot be performed due to an error. The system can also prevent a wasteful use of a storage capacity on the storage server due to unnecessary print data.

To provide an error notification herein to the user terminal apparatus, a general message communicator (e.g., SNMP TRAP) can be used.

A twelfth aspect of the present invention provides the print processing system according to the first to eleventh aspects of the present invention, wherein, when detecting an error, the management server provides an error notification to a manager terminal apparatus.

The system above can notify a manager of error occurrence related to the management server.

To provide an error notification herein to the manager terminal apparatus, e-mail can be used. Thereby, the manager can surely be notified of error occurrence regardless of the operation status of the manager terminal apparatus.

A thirteenth aspect of the present invention provides the print processing system according to the first to twelfth aspects of the present invention, wherein, when detecting an error, the printing apparatus and the storage server provide an error notification to the management server; and the management server, in response to the error notification from one of the printing apparatus and the storage server, provides an error notification to the manager terminal apparatus.

The system above can notify a manager of error occurrence related to the printing apparatus and the storage server.

Particularly, when the printing apparatus detects an error, it is preferable to notify a user of error occurrence on a display provided with the printing apparatus.

A fourteenth aspect of the present invention provides the print processing system according to the first to thirteenth aspects of the present invention, wherein at least two storage servers are provided for regular and backup use.

In the system above, the print data is stored in a multiple manner on the regular storage server and the backup storage server. Thereby, when the regular storage server is down, the print data can be recovered using the backup storage server. Further, when the print data is transmitted in an amount exceeding a storage capacity of the regular storage server, the print data can be transferred to the backup storage server, so as to prevent print unavailability due to excess storage capacity on the storage server.

A fifteenth aspect of the present invention provides the print processing system according to the first to fourteenth aspects of the present invention, wherein at least two management servers are provided for regular and backup use.

In the system above, the management data is stored in a multiple manner on the regular management server and the backup management server. Thereby, when the regular management server is down, the management data can be recovered using the backup management server.

The embodiments of the present invention are explained in the following, with reference to the above-described drawings.

Figure 2:
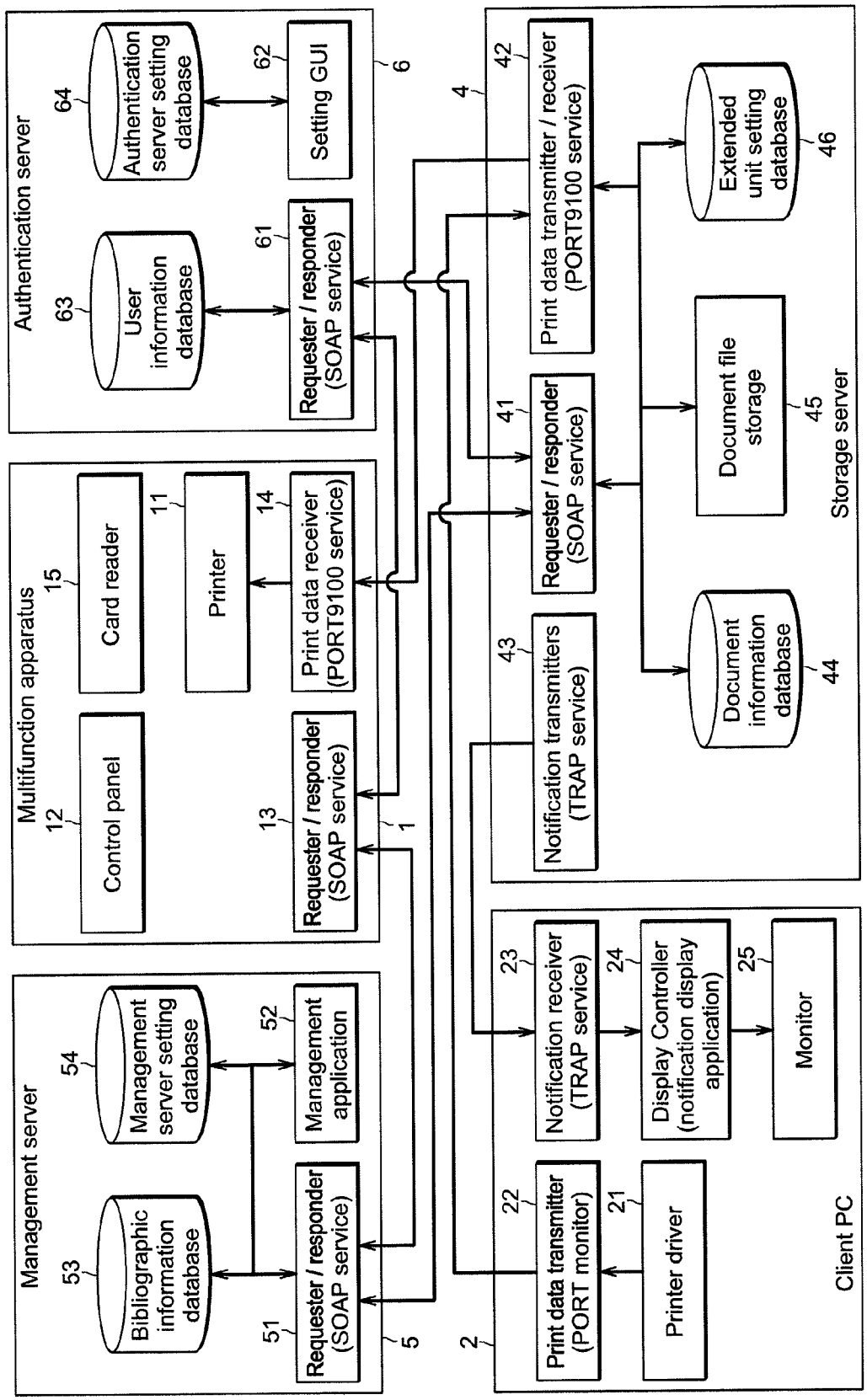
FIG. 2 is a block diagram illustrating a schematic configuration of a multifunction apparatus, a client PC, a storage server, a management server, and an authentication server.

FIG. 1 is a system configuration diagram of a print processing system according to the present invention. FIG. 2 is a block diagram illustrating a schematic configuration of a multifunction apparatus, a client PC, a storage server, a management server, and an authentication server, which are shown in FIG. 1.

The print processing system is used at the office, where a plurality of users share multifunction apparatus (printing apparatus) 1, as shown in FIG. 1. A plurality of multifunction apparatuses 1, a plurality of user client PCs (terminal apparatus) 2, manager client PC 3, a plurality of storage servers 4, management server 5, authentication server (user authenticator) 6, AD (Active Directory) server 7, and mail server 8 are mutually connected to a network (LAN).

In the print processing system, print data generated on user client PC 2 is temporarily stored on storage server 4. Then, multifunction apparatus 1 obtains the print data from storage server 4 and prints the data, in accordance with user's operation on multifunction apparatus 1. Management server 5 manages a storage status of the print data on storage server 4. Further, authentication server 6 performs user authentication so as to permit only a proper user permitted for use to perform printing. Management server 5 manages use of multifunction apparatus 1 per user.

A predetermined number of user client PCs 2 are assigned to storage server 4. The print data generated on user client PCs 2 are divided and stored on a plurality of storage servers 4. Storage server 4 is recognized as a virtual printer by client PC 2. When user client PC 2 provides a print instruction, the print data is transmitted to previously associated storage server 4 so as to be stored thereon.

Further, two types of storage servers 4 are provided for regular and backup use, so that regular storage server 4 and backup storage server 4 store the print data in a multiple manner. Thereby, when regular storage server 4 is down, the print data can be recovered by backup storage server 4. In addition, the system may be configured such that, when print data having a size exceeding a storage capacity of regular storage server 4, the print data is forwarded to backup storage server 4. Thereby, a situation can be prevented where printing cannot be performed due to an excessive storage capacity on storage server 4.

Furthermore, two management servers 5 are provided for regular and backup use, so that regular management server 5 and backup management server 5 store management data, including bibliographic information, in a multiple manner. Thereby, when regular management server 5 is down, the management data can be recovered by backup management server 5.

In this example, storage server 4 is connected to the network as an independent apparatus. The system may be configured, however, so as to use a storage apparatus (hard disk drive and the like) built in multifunction apparatus 1. Authentication server 6 may also be provided in multifunction apparatus 1.

As shown in FIG. 2, multifunction apparatus 1 includes printer 11, control panel 12, requester/responder (SOAP service) 13, print data receiver (PORT9100 service) 14, and card reader 15.

Printer 11 forms an image of a document on a recording paper based on print data, in an electrophotographic process and the like. Keys with which a user performs input operations are laid out on control panel 12. A touch panel display is also provided that displays a predetermined screen so as to allow a user to perform selection. Requester/responder 13 performs processing of a request and a response exchanged with management server 5 and authentication server 6. Print data receiver 14 receives the print data from storage server 4.

Client PC 2 includes printer driver 21, print data transmitter (PORT monitor) 22, notification receiver (TRAP service) 23, display controller (notification display application) 24, and monitor 25.

Printer driver 21 generates the print data described in a page description language (e.g., PostScript) interpretable by multifunction apparatus 1. Print data transmitter 22 transmits the print data to storage server 4. Notification receiver 23 receives from storage server 4, a storage completion notification and an error notification. Display controller 24 performs processing for displaying on monitor 25, the received storage completion notification and error notification.

Storage server 4 includes requester/responder (SOAP service) 41, print data transmitter/receiver (PORT9100 service) 42, notification transmitter (TRAP service) 43, document information database 44, document file storage (print data storage) 45, and storage server setting database 46.

Requester/responder 41 performs processing of a request and a response exchanged with management server 5 and authentication server 6. Print data transmitter/receiver 42 receives the print data from client PC 2 and transmits the print data to multifunction apparatus 1. Notification transmitter 43 transmits to client PC 2, a storage completion notification and an error notification. Document information database 44 stores document information per document (print job). Document file storage 45 saves the print data as a file. Storage server setting database 46 stores setting information and operation log information of storage server 4.

Management server 5 includes requester/responder (SOAP service) 51, management application 52, bibliographic information database (bibliographic information storage) 53, and management server setting database 54.

Requester/responder 51 performs processing of a request and a response exchanged with storage server 4 and multifunction apparatus 1. Management application 52 causes a manager to perform management and setting associated with processes on management server 5. Bibliographic information database 53 stores the bibliographic information per document (print job). Management server setting database 54 stores setting information and operation log information of management server 5.

Authentication server 6 includes requester/responder (SOAP service) 61, setting GUI (graphical user interface) 62, user information database 63, and authentication server setting database 64.

Requester/responder 61 performs processing of a request and a response exchanged with storage server 4 and multifunction apparatus 1. Setting GUI 62 causes a manager to perform setting of authentication server 6. User information database 63 stores information required for user authentication. Authentication server setting database 64 stores setting information of authentication server 6.

Figure 3:
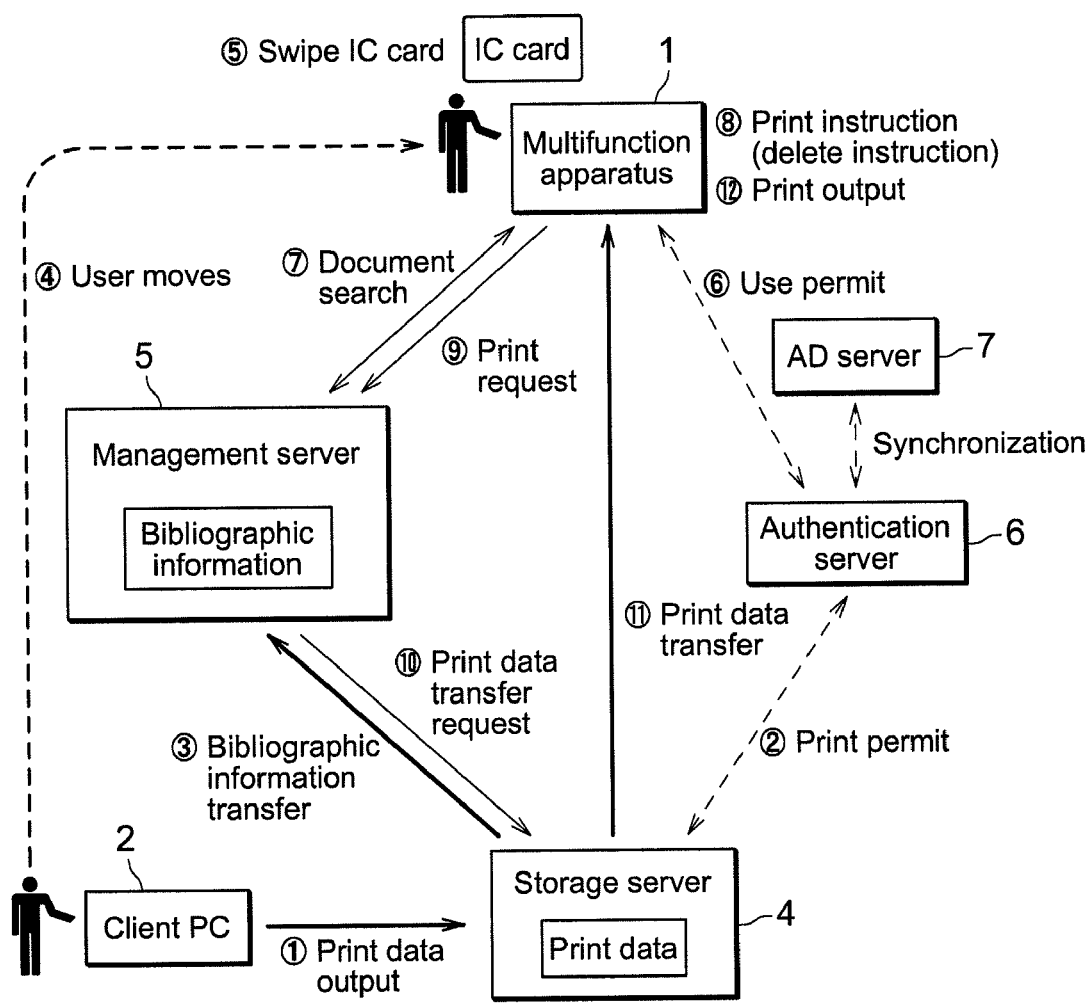
FIG. 3 is a conceptual diagram illustrating a processing procedure in the print processing system shown in FIG. 1.

FIG. 3 is a conceptual diagram illustrating a processing procedure in the print processing system shown in FIG. 1.

When a user first provides a print instruction on user client PC 2, print data is transmitted from client PC 2 to storage server 4. Subsequently, authentication server 6 performs user authentication to verify whether or not the user transmitting the print data is a proper user permitted to perform printing. When the user authentication is successful, the print data is stored on storage server 4, and bibliographic information in the print data is transferred from storage server 4 to management server 5.

The print data stored on storage server 4 can be printed on any multifunction apparatus 1. When the user goes to predetermined multifunction apparatus 1 and holds an IC card over card reader 15 of multifunction apparatus 1, authentication server 6 performs user authentication to verify whether or not the user is a proper user permitted to use multifunction apparatus 1. When the user authentication is successful, multifunction apparatus 1 causes management server 5 to search for documents associated with the user. When the user selects a predetermined document from the searched documents and provides a print instruction, multifunction apparatus 1 transmits a print request to management server 5, which then requests storage server 4 to transfer the print data. In response, storage server 4 transfers the print data to multifunction apparatus 1, which then prints out the document.

Figure 4:
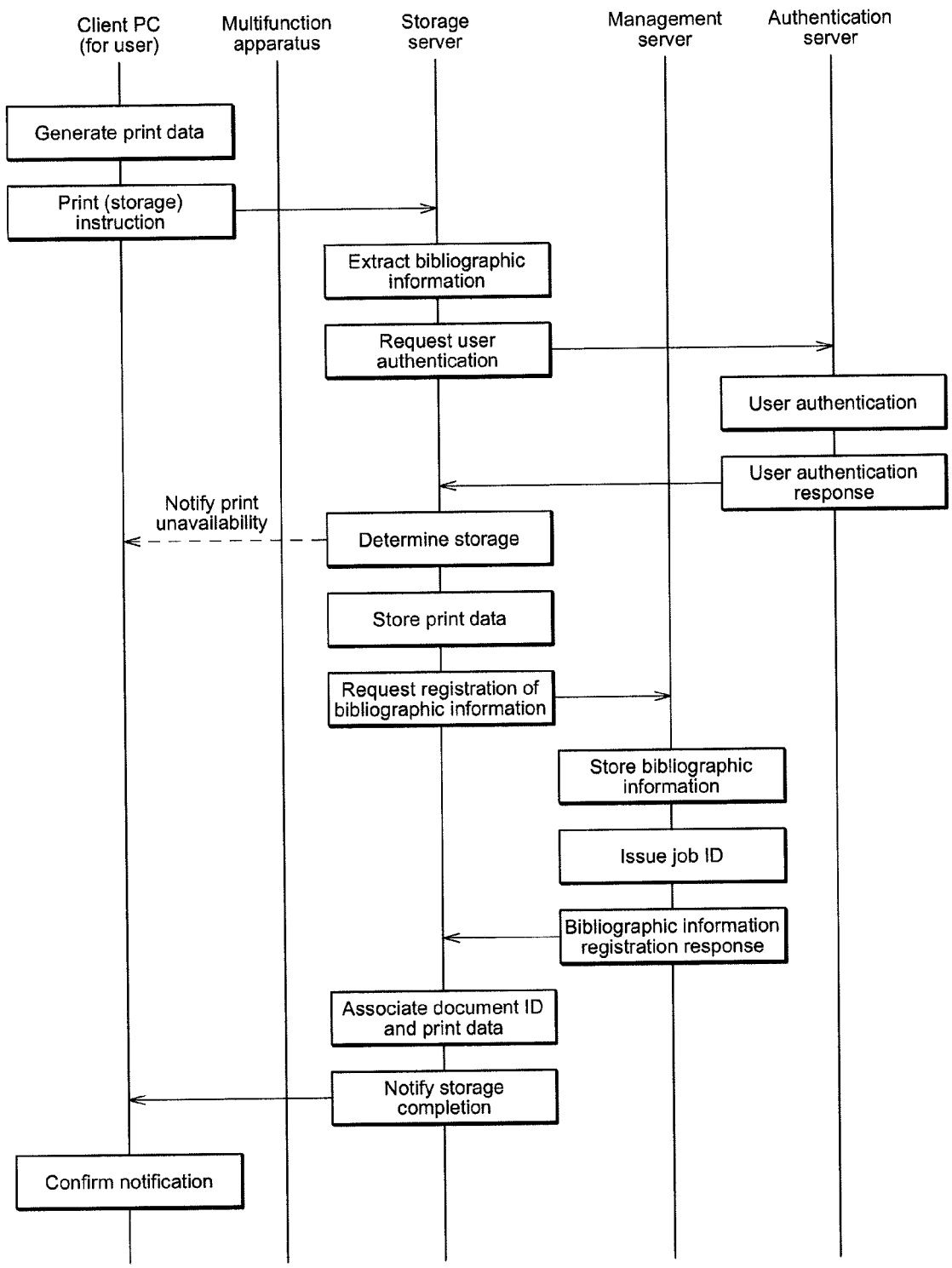
FIG. 4 is a sequence diagram illustrating a processing procedure from print data generation to bibliographic information registration in the print processing system shown in FIG. 1.
Figure 5:
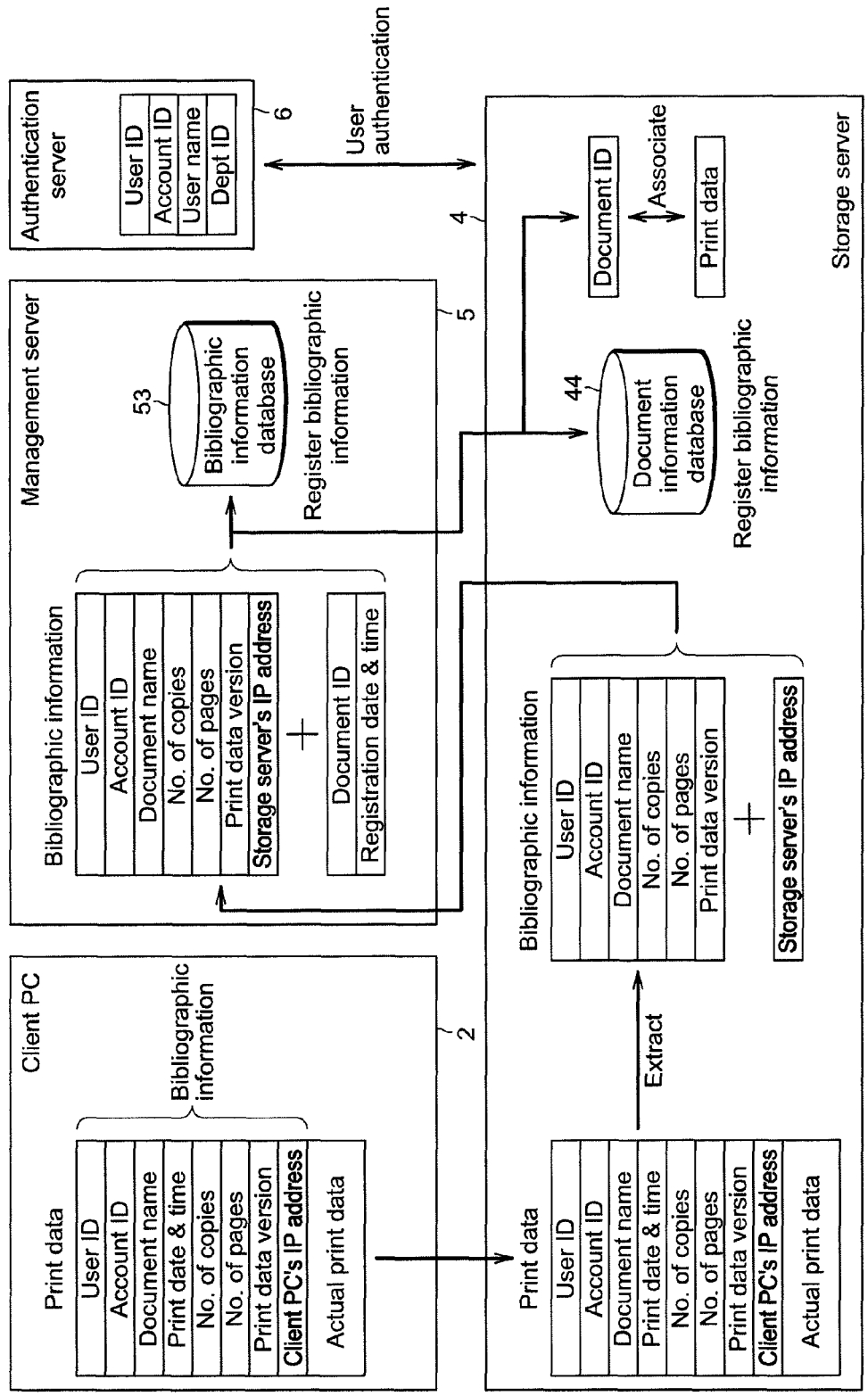
FIG. 5 is a conceptual diagram illustrating an overview of processing bibliographic information on the client PC, the storage server, and the management server.
Figure 6:
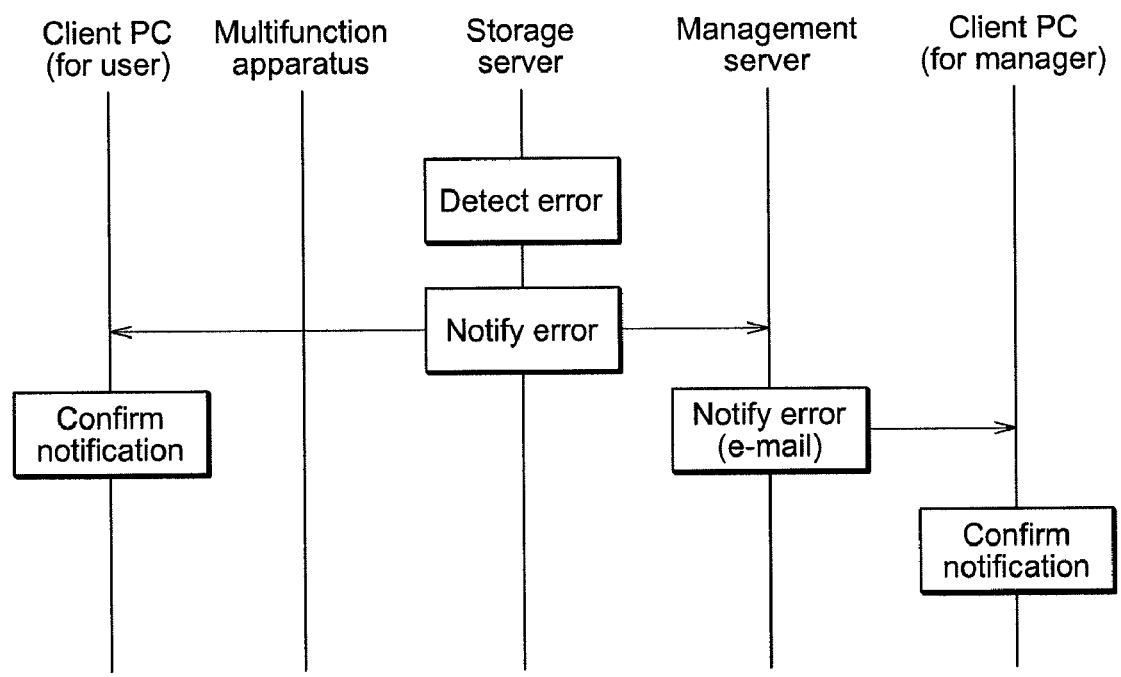
FIG. 6 is a sequence diagram illustrating a processing procedure on the storage server shown in FIG. 4, when an error is detected.

FIG. 4 is a sequence diagram illustrating a processing procedure from print data generation to bibliographic information registration in the print processing system shown in FIG. 1. FIG. 5 is a conceptual diagram illustrating an overview of processing bibliographic information on the client PC, the storage server, and the management server. FIG. 6 is a sequence diagram illustrating a processing procedure on the storage server shown in FIG. 4, when an error is detected.

When an instruction to print a document is provided on client PC 2 with a predetermined application, printer driver 21 generates print data, and print data transmitter 22 transmits a print (storage) instruction along with the print data to print data transmitter/receiver 42 of storage server 4.

In this process, the print data generated at printer driver 21 of client PC 2 includes actual print data, which indicates specific contents of the document, and bibliographic information. The bibliographic information includes a user ID, an account ID, a document name, a print date and time, a number of copies, a number of pages, a print data version, and an IP address of client PC 2. The bibliographic information is described in a command language for printing (e.g., PJL or Printer Job Language) (refer to FIG. 5).

When receiving the print data from client PC 2, storage server 4 performs a process to decipher the command language for printing included in the print data, so as to extract the bibliographic information. Then, storage server 4 transmits a user authentication request, which includes the user information (user ID, account ID, and the like) in the bibliographic information, from requester/responder 41 to requester/responder 61 of authentication server 6.

When receiving the user authentication request from storage server 4, authentication server 6 performs user authentication based on the user information obtained herein. Then, authentication server 6 transmits a user authentication response, which includes authentication result information indicating success or failure of the user authentication, from requester/responder 61 to requester/responder 41 of storage server 4.

Storage server 4 receives the user authentication response from authentication server 6. When the user authentication is successful, storage server 4 determines whether or not a threshold associated with print data storage set per user (e.g., associated with a number of documents (print jobs)) is exceeded by the print data transmitted from client PC 2 for which user authentication is successful. When determining that the print data threshold is not exceeded, storage server 4 saves the print data obtained from client PC 2 in document file storage 45.

Conversely, when determining that the print data threshold is exceeded, storage server 4 rejects storage of the print data with successful user authentication. Then, storage server 4 transmits a print unavailable notification from notification transmitter 43 to notification receiver 23 of client PC 2. Based on the print unavailable notification from storage server 4, client PC 2 causes display controller 24 to display on monitor 25, a message indicating that printing is unacceptable since the upper limit is exceeded. Thereby, the user can confirm that printing cannot be performed.

When completing saving the print data, storage server 4 transmits a bibliographic information registration request, which includes the bibliographic information, from requester/responder 41 to requester/responder 51 of management server 5 (refer to FIG. 5).

When receiving the bibliographic information registration request from storage server 4, management server 5 registers the bibliographic information obtained herein in bibliographic information database 53. In addition, management server 5 issues identification information (document ID) of a print job associated with the bibliographic information and a registration date and time thereof. Then, management server 5 stores in bibliographic information database 53, the document ID, the registration date and time, and identification information (e.g., IP address) of storage server 4, along with the associated bibliographic information obtained from storage server 4 (refer to FIG. 5). Thereafter, management server 5 transmits a bibliographic information registration response, which includes the bibliographic information added with the document ID and registration date and time, from requester/responder 51 to requester/responder 41 of storage server 4.

When receiving the bibliographic information registration response from management server 5, storage server 4 associates the document ID and registration date and time obtained herein with the print data (refer to FIG. 5) and stores the information in document information database 44. Then, storage server 4 transmits a storage completion notification, which indicates that the print data has properly been stored, from notification transmitter 43 to notification receiver 23 of client PC 2.

When receiving the storage completion notification from storage server 4, client PC 2 causes display controller 24 to display on monitor 25, a message indicating that the print data was properly stored, based on the storage completion notification. Thereby, the user can confirm that the print data was stored.

In cases such as where a communication error occurs due to a cancel operation after a print instruction provided on client PC 2; where an error occurs due to an insufficient capacity of document file storage 45 of storage server 4 at the time of saving of print data; where an error occurs due to a connection failure with authentication server 6 or a failure in user authentication at the time of user authentication; and where an error occurs due to a connection failure with management server 5 at the time of bibliographic information registration; storage server 4 detects an error. Storage server 4 then transmits an error notification from notification transmitter 43 to notification receiver 23 of client PC 2, as shown in FIG. 6. Based on the error notification from storage server 4, client PC 2 causes display controller 24 to display on monitor 25, a message indicating that an error has occurred. Thereby, the user can confirm that the error has occurred.

When necessary, storage server 4 further transmits an error notification to management server 5. When receiving the error notification from storage server 4, management server 5 transmits an e-mail message indicating details of the error to manager client PC 3 via mail server 8. Thereby, the manager can confirm that the error has occurred.

Figure 8A:
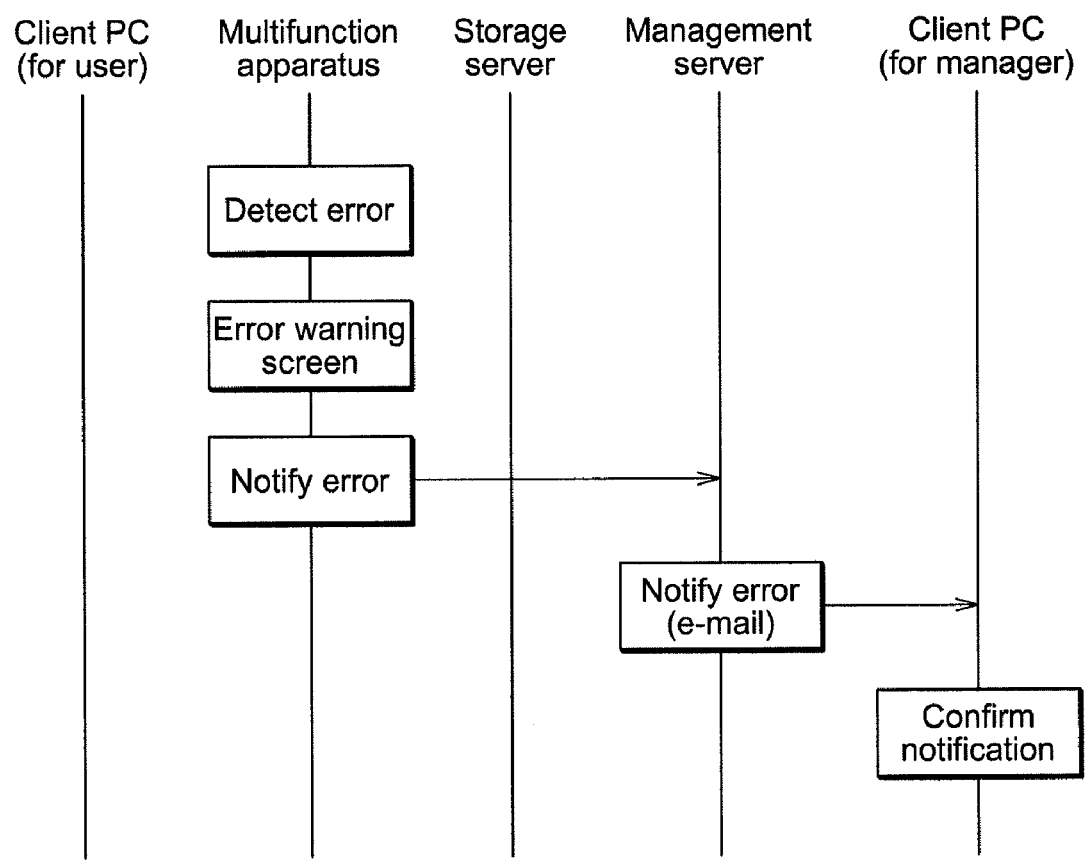
FIGS. 8A to 8C are sequence diagrams illustrating a processing procedure on the multifunction apparatus shown in FIG. 7, when an error is detected.
Figure 8B:
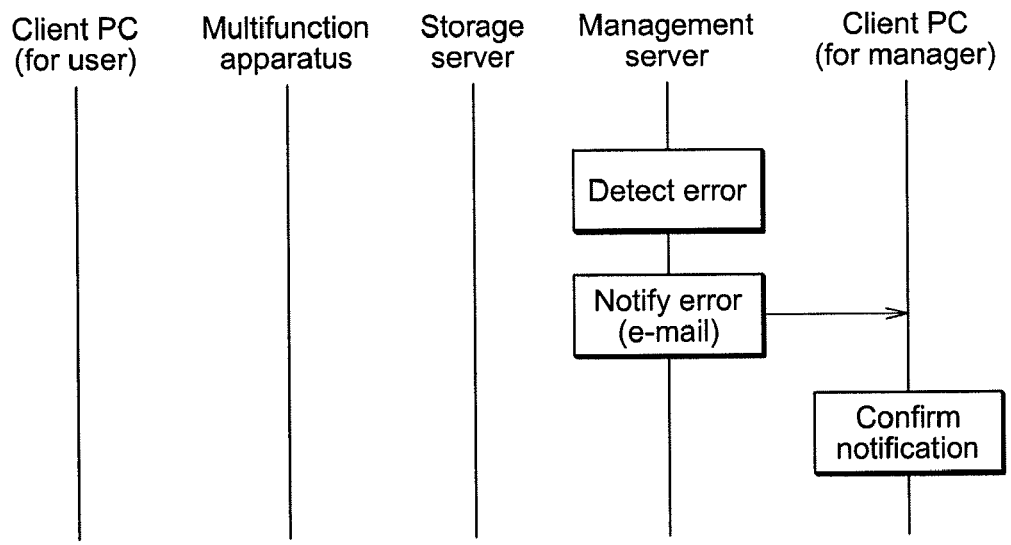
Figure 8C:
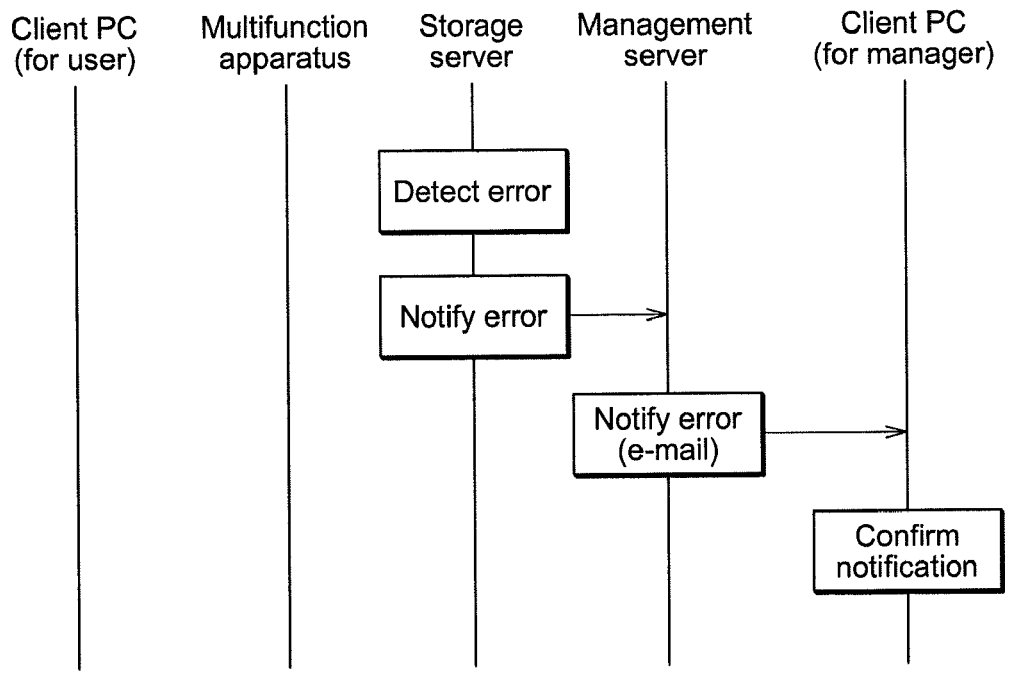

FIG. 7 is a sequence diagram illustrating a processing procedure from print instruction to print end on the multifunction apparatus of the print processing system shown in FIG. 1. FIGS. 8A to 8C are sequence diagrams illustrating a processing procedure on the multifunction apparatus shown in FIG. 7, when an error is detected. FIGS. 9A through 11 illustrate screens displayed on the control panel of the multifunction apparatus during the processes shown in FIGS. 7 to 8C.

Figure 9A:
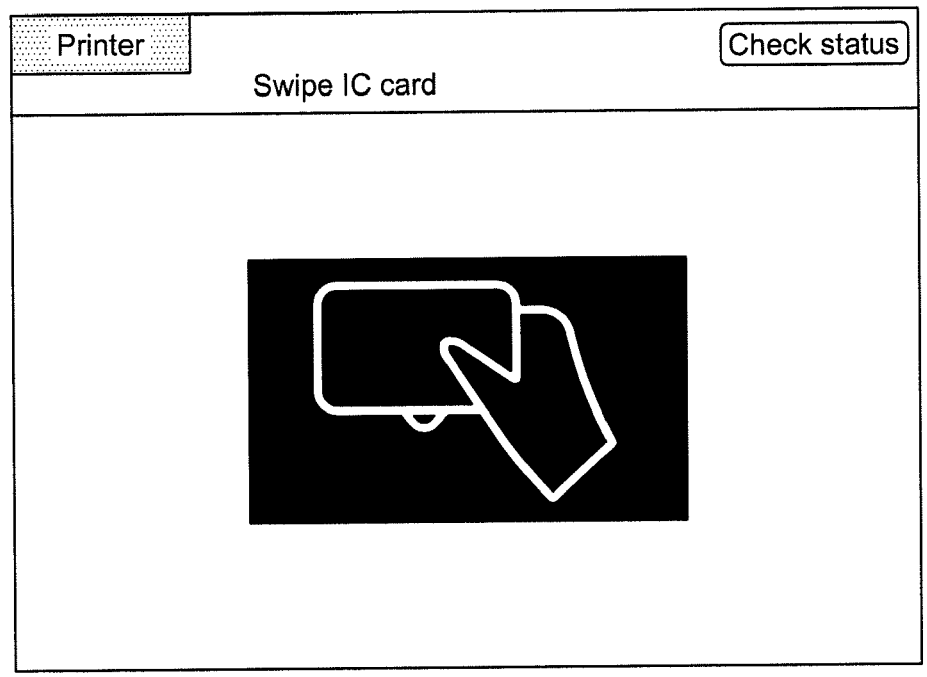
FIGS. 9A and 9B illustrate screens displayed on a control panel of the multifunction apparatus during the processes shown in FIGS. 7 to 8C.

When a user selects a print function on a main screen displayed on control panel 12 of multifunction apparatus 1, an authentication wait screen is displayed (refer to FIG. 9A). When the user holds an IC card over card reader 15 herein, authentication information (user ID and the like) stored on the IC card is read out, and a user authentication request, which includes the user information, is transmitted from requester/responder 13 to requester/responder 61 of authentication server 6.

When receiving the user authentication request from multifunction apparatus 1, authentication server 6 performs user authentication based on the user information obtained herein. Then, authentication server 6 transmits a user authentication response, which includes authentication result information indicating success or failure of user authentication, from requester/responder 61 to requester/responder 13 of multifunction apparatus 1.

Multifunction apparatus 1 receives the user authentication response from authentication server 6. When the user authentication is successful, multifunction apparatus 1 transmits a document list information request, which includes the user information (user ID and the like) obtained from the IC card, from requester/responder 13 to requester/responder 51 of management server 5.

When receiving the document list information request from multifunction apparatus 1, management server 5 searches bibliographic information database 53 for bibliographic information of documents associated with the user, based on the user information obtained herein (user ID and the like). Then, management server 5 transmits a document list information response, which includes the identified bibliographic information associated with all the documents, from requester/responder 51 to requester/responder 13 of multifunction apparatus 1.

Figure 9B:
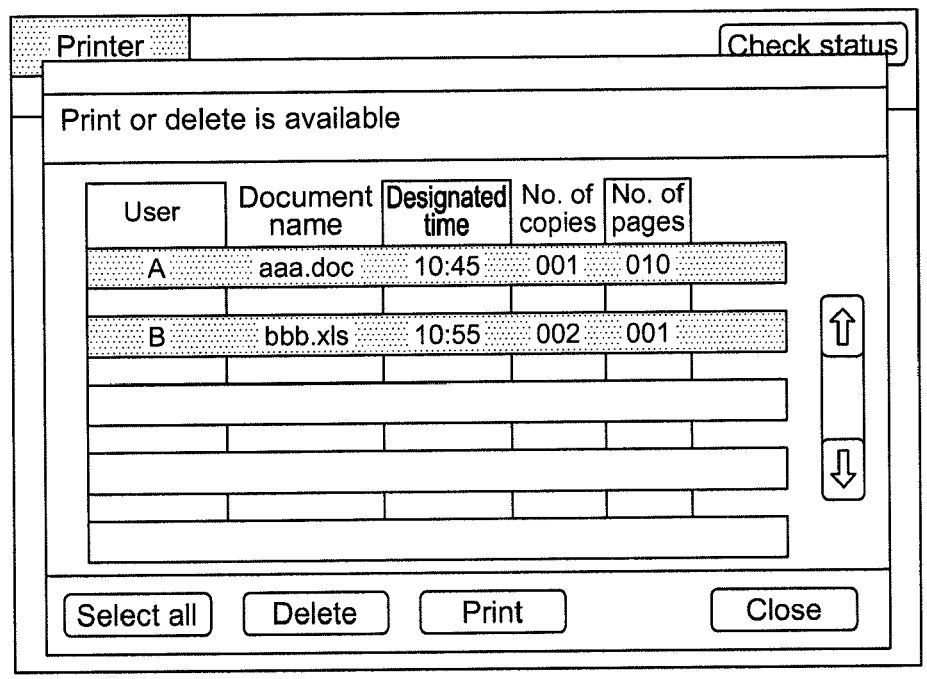
Figure 10A:
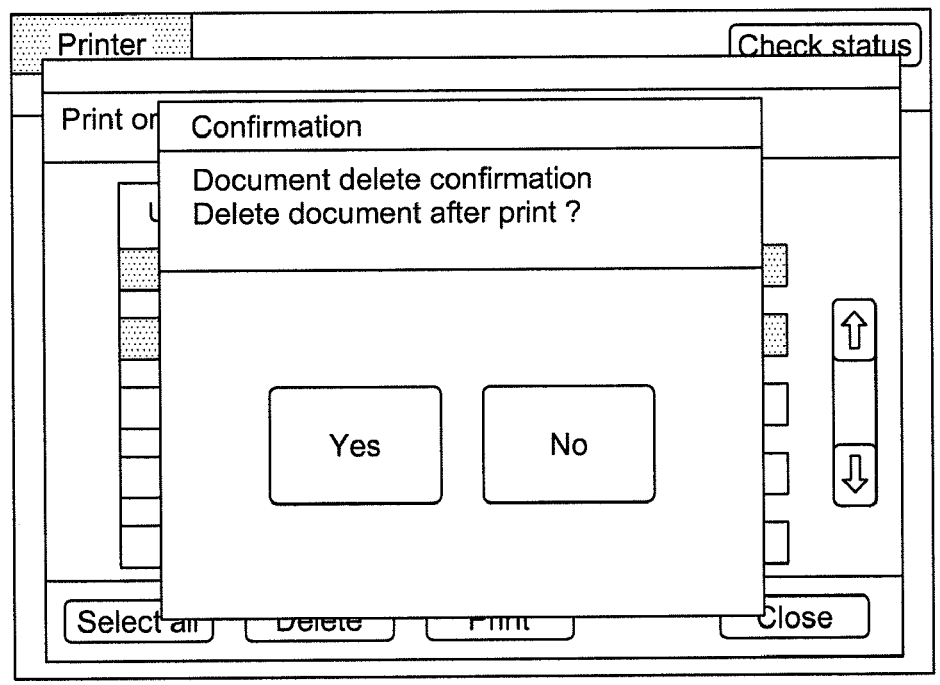
FIGS. 10A and 10B illustrate screens displayed on the control panel of the multifunction apparatus during the processes shown in FIGS. 7 to 8C.
Figure 10B:
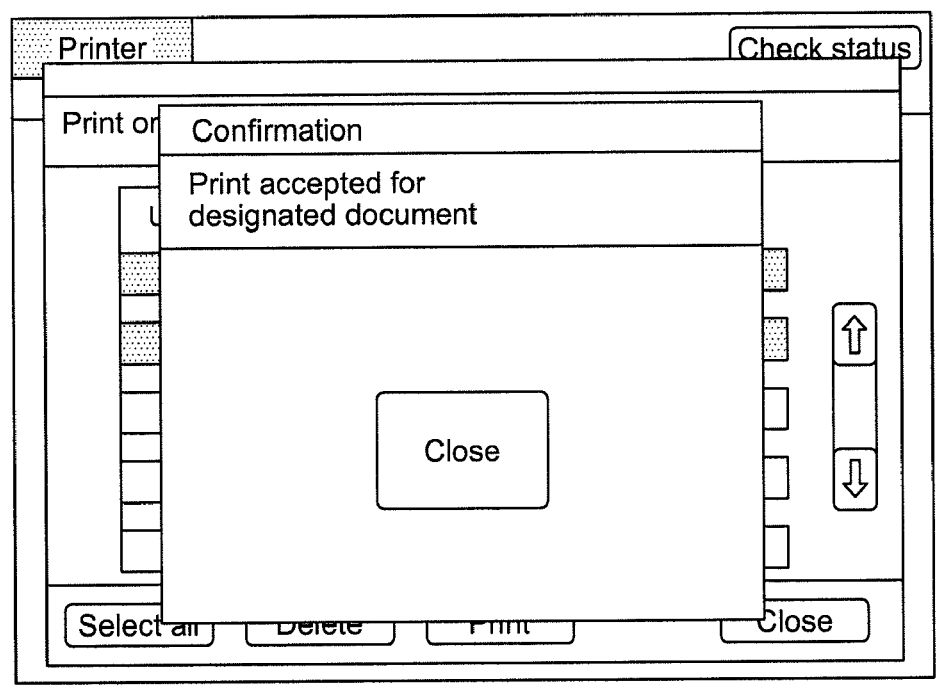

When receiving the document list information response from management server 5, multifunction apparatus 1 displays a document list screen on control panel 12, based on the bibliographic information obtained herein (refer to FIG. 9B). When the user selects a predetermined document on the document list screen and operates a print button, a delete confirmation screen is displayed (refer to FIG. 10A). The delete confirmation screen inquires whether or not the print data associated with the document is deleted after being printed. When the user selects "Yes" on the delete confirmation screen, a document print request, which includes document identification information (document ID and the like) and delete instruction information, is transmitted from requester/responder 13 to requester/responder 51 of management server 5.

When receiving the document print request from multifunction apparatus 1, management server 5 searches bibliographic information database 53 based on the document identification information obtained herein (document ID and the like), in order to identify storage server 4 storing the print data associated with the designated document, based on the identification information (including an IP address of storage server 4). When identifying associated storage server 4 based on the identification information, management server 5 transmits a document print response from requester/responder 51 to requester/responder 13 of multifunction apparatus 1. Then, multifunction apparatus 1 displays a print acceptance screen, which indicates that print was accepted (refer to FIG. 10B). In addition, management server 5 transmits a print data transfer request from requester/responder 51 to requester/responder 41 of storage server 4, based on the identification information of storage server 4. The print data transfer request includes the document identification information (document ID and the like) and identification information (IP address and the like) of multifunction apparatus 1 that performs printing.

When receiving the print data transfer request from management server 5, storage server 4 searches the print data saved in document file storage 45, based on the document identification information obtained herein (document ID and the like). When identifying the associated print data, storage server 4 transmits the print data from print data transmitter/receiver 42 to print data receiver 14 of multifunction apparatus 1, based on the identification information (IP address and the like) of multifunction apparatus 1 that performs printing, the information being obtained from management server 5. Then, multifunction apparatus 1 prints the document.

In cases such as where an error occurs due to a connection failure with authentication server 6 or a failure in user authentication at the time of user authentication, and where a communication error with management server 5 occurs at the time of bibliographic list information request or document print request, multifunction apparatus 1 detects an error. Multifunction apparatus 1 then displays an error warning screen on control panel 12, as shown in FIG. 8A (refer to FIG. 11). The error warning screen displays a message indicating details of the error in a message display field. Thereby, the user can confirm that the error has occurred.

When necessary, multifunction apparatus 1 further transmits an error notification to management server 5. When receiving the error notification from multifunction apparatus 1, management server 5 transmits an e-mail message indicating details of the error to manager client PC 3 via mail server 8. Thereby, the manager can confirm that the error has occurred.

In cases such as where a communication error with multifunction apparatus 1 occurs at the time of bibliographic list information response or document print response, and where a communication error with storage server 4 occurs at the time of print request, management server 5 detects an error. Management server 5 then transmits an e-mail message indicating details of the error to manager client PC 3 via mail server 8, as shown in FIG. 8B. Thereby, the manager can confirm that the error has occurred.

In cases such as where an error occurs in a process of print request reception from management server 5, where multifunction apparatus 1 does not respond at the time of data transmission, and where a communication error with multifunction apparatus 1 occurs at the time of print data transmission, storage server 4 detects an error. Storage server 4 then transmits an error notification to management server 5, as shown in FIG. 8C. When receiving the error notification from storage server 4, management server 5 transmits an e-mail message indicating details of the error to manager client PC 3 via mail server 8. Thereby, the manager can confirm that the error has occurred.

Figure 12:
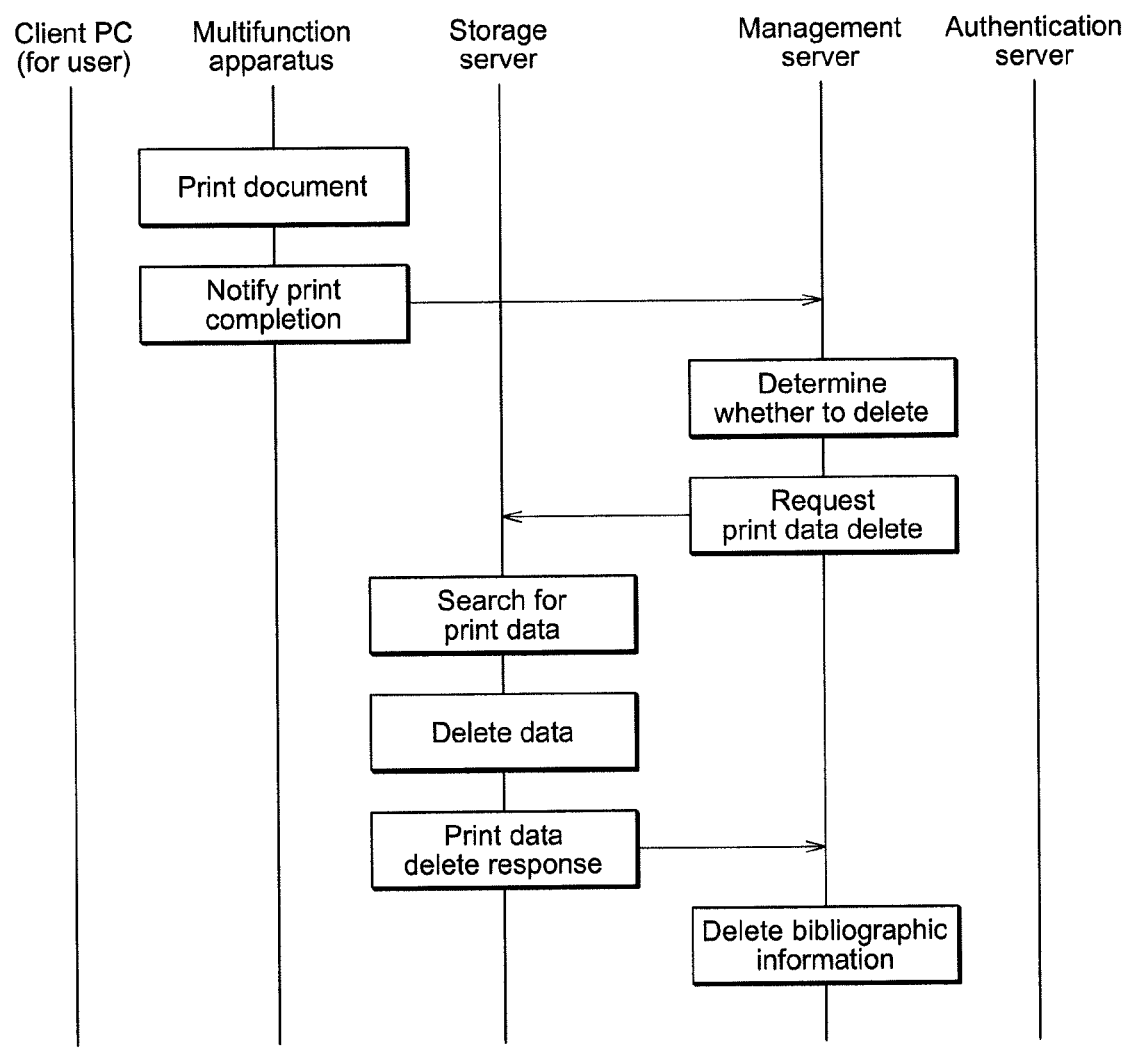
FIG. 12 is a sequence diagram illustrating a processing procedure for deleting data after printing a document shown in FIG. 7.

FIG. 12 is a sequence diagram illustrating a processing procedure for deleting data after printing a document shown in FIG. 7.

When multifunction apparatus 1 executes printing of a document, as shown in FIG. 7, requester/responder 13 transmits a print completion notification to requester/responder 51 of management server 5.

When receiving the print completion notification from multifunction apparatus 1, management server 5 determines whether or not the document is set to be deleted after printing. When determining that the document is set to be deleted, management server 5 transmits a print data delete request, which includes the document identification information (document ID and the like), from requester/responder 51 to requester/responder 41 of storage server 4.

Management server 5 retains the delete instruction information per document, which relates to whether or not to delete the print data after printing. As described above, the delete instruction information is transmitted to management server 5, along with the document print request, when the user designates and enters the information on the delete conformation screen (refer to FIG. 10A), which inquires whether or not to delete the print data after printing, at the time of print instruction on multifunction apparatus 1.

The system may be configured, such that a user enters whether or not to delete the print data after printing on client PC 2 in setting of printer drive 21 or on a displayed inquiry screen for a user; that the delete instruction information obtained thereby is added to the print data along with the bibliographic information and transmitted to storage server 4; and that the delete instruction information, along with the bibliographic information, is then transferred from storage server 4 to management server 5, so that management server 5 obtains the delete instruction information by the user.

Alternatively, a manager may previously perform setting relating to print data deletion after printing on management server 5. In this case, the manager sets whether or not to forcibly delete the print data after printing regardless of user's selection on print data deletion after printing; a valid storage period of the print data when user's selection on print data deletion after printing is admitted; and the like.

When receiving the print data delete request from management server 5, storage server 4 searches the print data saved in document file storage 45 for the print data of the associated document, based on the document identification information obtained herein (document ID and the like). Storage server 4 deletes the identified print data and the bibliographic information associated with the document registered in document information database 44. Then, storage server 4 transmits a print data delete response from requester/responder 41 to requester/responder 51 of management server 5.

When receiving the print data delete response from storage server 4, management server 5 deletes the bibliographic information associated with the document registered in bibliographic information database 53.

When detecting an error in a case such as where a communication error with storage server 4 occurs at the time of print data delete request, management server 5 transmits e-mail including an error message to manager client PC 3, in the procedure shown in FIG. 8B. When detecting an error in a case where an error occurs in a process of receiving a print data delete request from management server 5, storage server 4 transmits e-mail including an error message to manager client PC 3, in the procedure shown in FIG. 8C. Thereby, the manager can confirm that the error has occurred.

Figure 13:
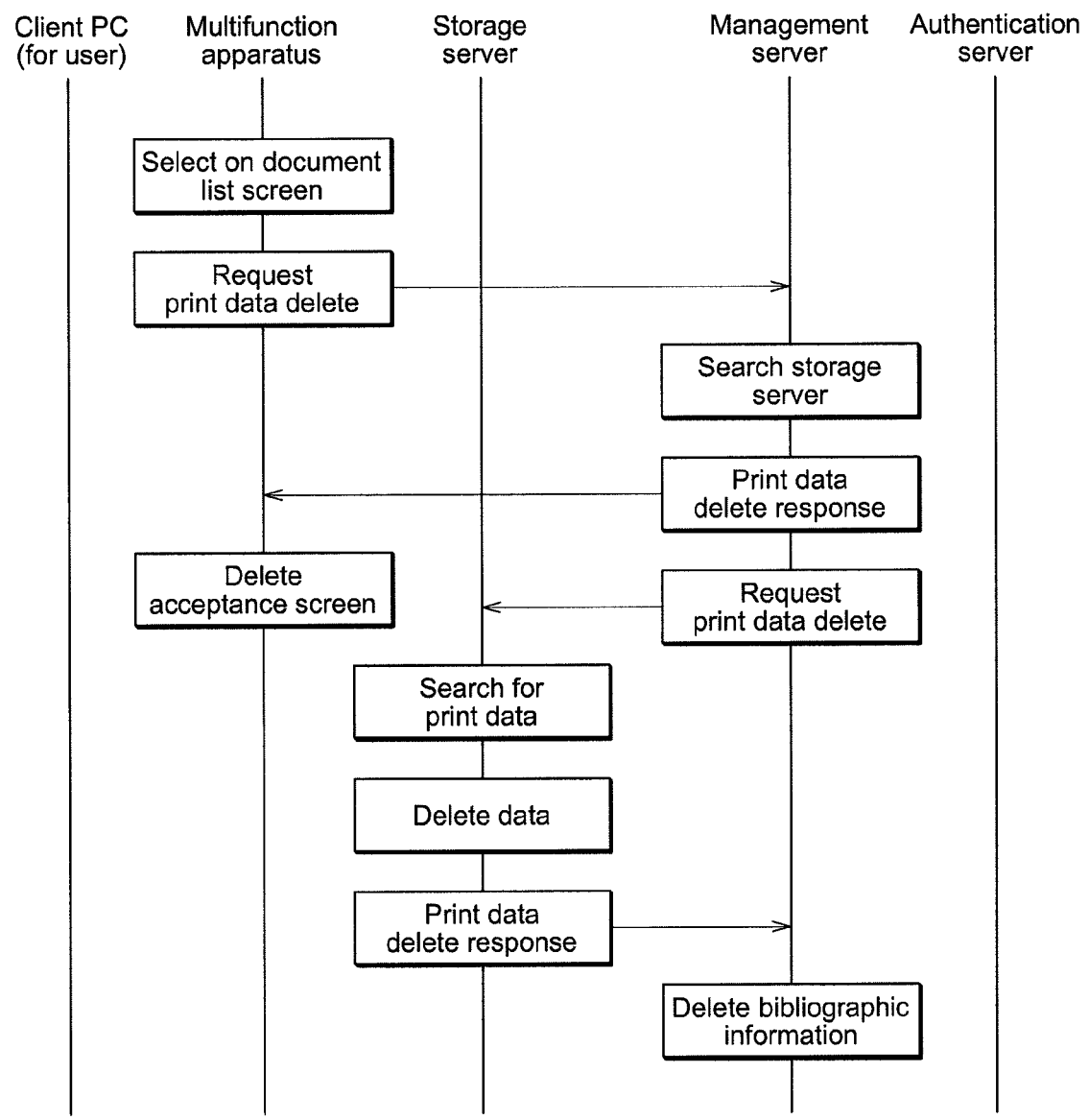
FIG. 13 is a sequence diagram illustrating a processing procedure for deleting an unnecessary document in the print processing system shown in FIG. 1.
Figure 14A:
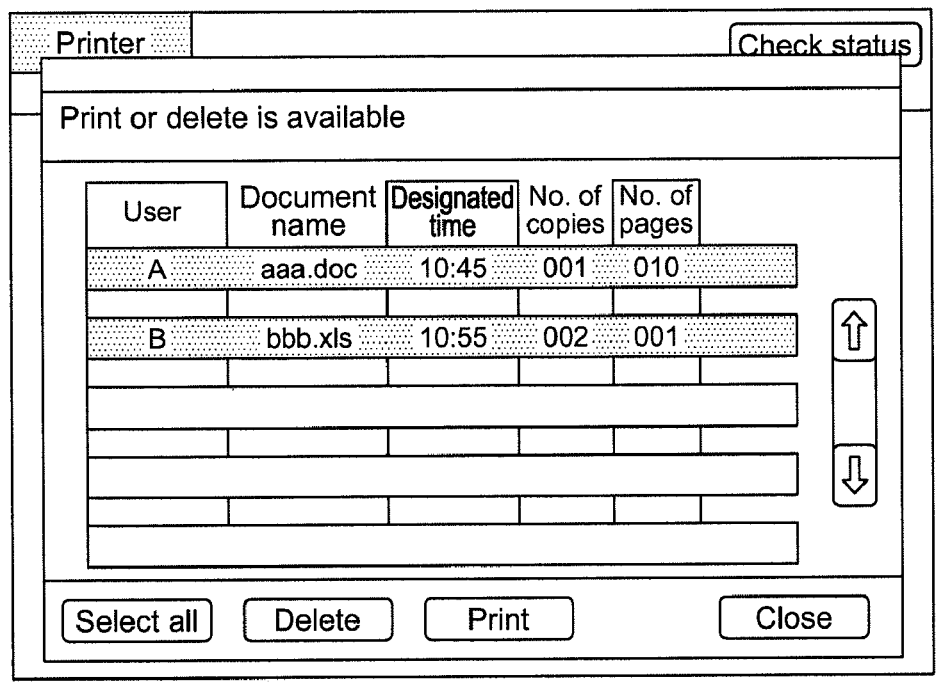
FIGS. 14A and 14B illustrate screens displayed on the control panel of the multifunction apparatus during the process shown in FIG. 13.
Figure 14B:
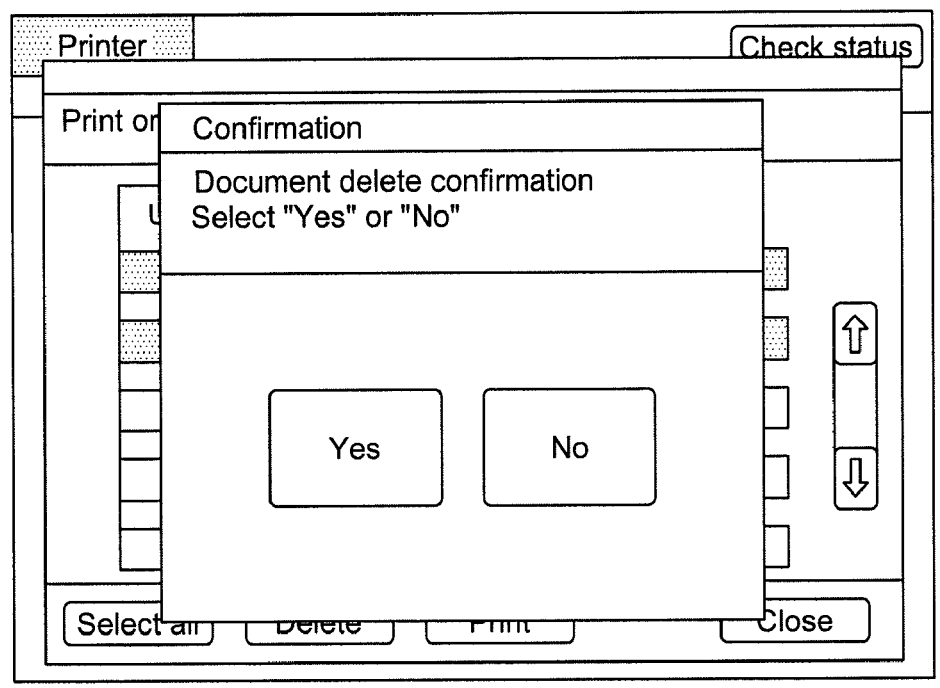
Figure 15:
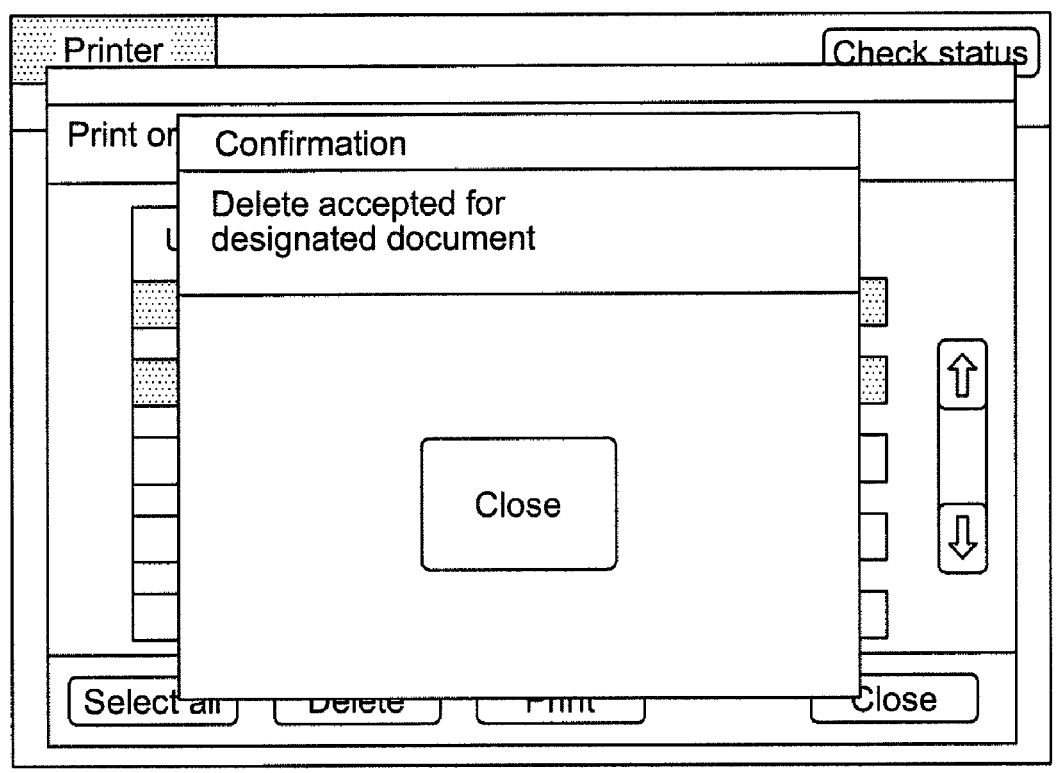
FIG. 15 illustrates a screen displayed on the control panel of the multifunction apparatus during the process shown in FIG. 13.

FIG. 13 is a sequence diagram illustrating a processing procedure for deleting an unnecessary document in the print processing system shown in FIG. 1. FIGS. 14A to 15 illustrate screens displayed on the control panel of the multifunction apparatus during the process shown in FIG. 13.

As described above, when the user holds an IC card over card reader 15 for user authentication, multifunction apparatus 1 displays on the control panel, the document list screen displaying a list of documents associated with the user (refer to FIG. 14A). When the user selects a predetermined document on the document list screen and operates a delete button, a delete confirmation screen is displayed (refer to FIG. 14B). When the user selects "Yes" on the delete confirmation screen, a print data delete request, which includes the document identification information (document ID and the like), is transmitted from requester/responder 13 to requester/responder 51 of management server 5.

When receiving the print data delete request from multifunction apparatus 1, management server 5 searches bibliographic information database 53 for storage server 4 storing the print data associated with the designated document, based on the document identification information obtained herein (document ID and the like). When identifying associated storage server 4, management server 5 transmits a print data delete response from requester/responder 51 to requester/responder 13 of multifunction apparatus 1. Then, multifunction apparatus 1 displays a delete acceptance screen, which indicates that document deletion was accepted (refer to FIG. 15). In addition, management server 5 transmits a print data delete request, which includes the document identification information (document ID and the like), from requester/responder 51 to requester/responder 41 of storage server 4.

When receiving the print data delete request from management server 5, storage server 4 searches the print data saved in document file storage 45, based on the document identification information obtained herein (document ID and the like). When identifying the associated print data, storage server 4 deletes the print data and the bibliographic information associated with the document registered in document information database 44. Then, storage server 4 transmits a print data delete response from requester/responder 41 to requester/responder 51 of management server 5.

When receiving the print data delete response from storage server 4, management server 5 deletes the bibliographic information associated with the document registered in bibliographic information database 53.

Figure 11:
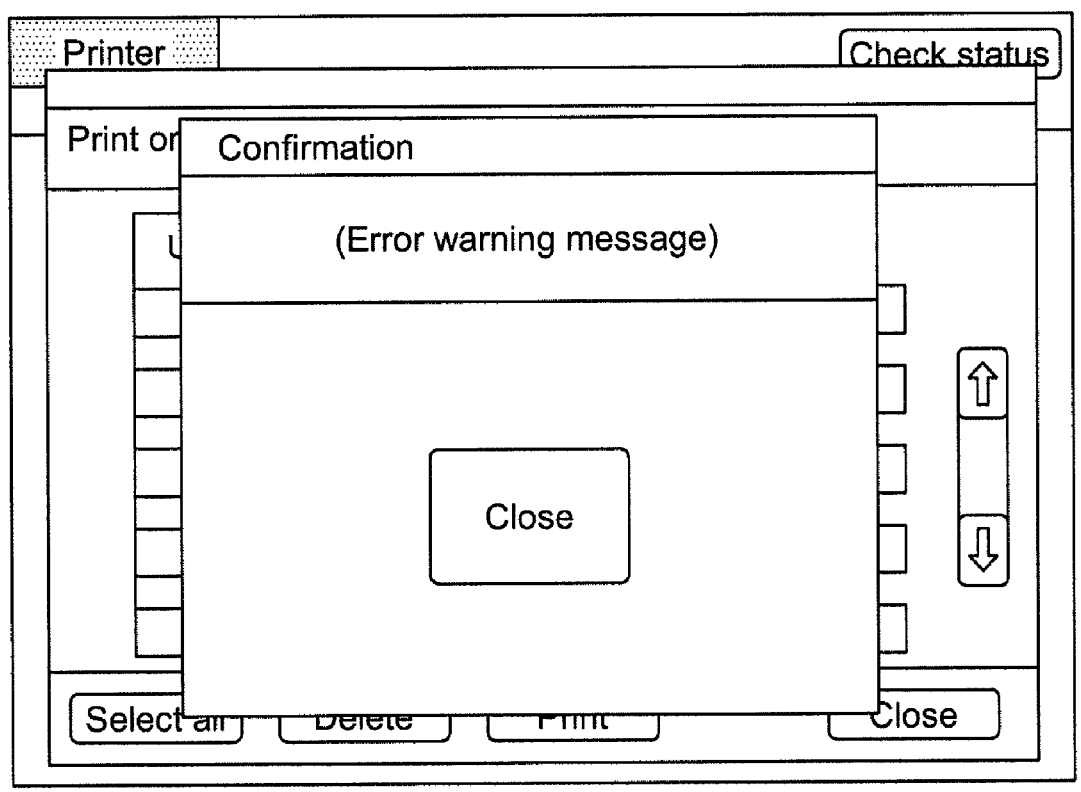
FIG. 11 illustrates a screen displayed on the control panel of the multifunction apparatus during the processes shown in FIGS. 7 to 8C.

When detecting an error in a case such as where a communication error with storage server 4 occurs at the time of print data delete request from multifunction apparatus 1, multifunction apparatus 1 displays an error warning screen on the control panel, as shown in FIG. 8A (refer to FIG. 11). Thereby, the user can confirm that the error has occurred.

When detecting an error in a case such as where a communication error with multifunction apparatus 1 occurs at the time of print data delete response, management server 5 transmits e-mail including an error message to manager client PC 3, in the procedure shown in FIG. 8B. When detecting an error in a case where an error occurs in a process of receiving a print data delete request from management server 5, storage server 4 transmits e-mail including an error message to manager client PC 3, in the procedure shown in FIG. 8C. Thereby, the manager can confirm that the error has occurred.

Management server 5 may be configured so as to delete a designated document whenever a document to which a delete instruction is provided has been printed or multifunction apparatus 1 issues a print data delete request. Management server 5 may also be configured so as to temporarily invalidate a document to be deleted, and then to delete the invalidated document along with other invalidated documents at a timing specified by document invalidation management (storage quantity, storage period, and the like).

The print processing system according to the present invention simplifies a configuration of the user terminal apparatus and processing on the two servers for storing and managing the print data respectively. The print processing system is effective as a print processing system in which a storage server temporarily stores print data generated on a terminal apparatus of each user; a printing apparatus then obtains the print data from the storage server and prints the data, according to user's operation on the printing apparatus; and a management server manages a storage status of the print data on the storage server.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A print processing system in which a storage server temporarily stores print data generated on a terminal apparatus of each user; a printing apparatus that obtains the print data from the storage server and prints the data, according to a user's operation on the printing apparatus; and a management server that manages a storage status of the print data on the storage server; wherein
    the terminal apparatus transmits to the storage server, bibliographic information associated with the print data concurrently with transmitting of the data;
    the storage server stores thereon the print data obtained from the terminal apparatus and transfers to the management server, the bibliographic information obtained from the terminal apparatus;
    the management server manages the storage status of the print data on the storage server, based on the bibliographic information obtained from the storage server,
    the printing apparatus provides the management server with a print request associated with a designated document, according to a print instruction that a user provides by designating a document;
    the management server, in response to the print request from the printing apparatus, provides the storage server storing the print data associated with the designated document, with a transfer request of the print data to the printing apparatus providing the print request; and
    the storage server, in response to the transfer request from the management server, transfers the print data to the printing apparatus providing the print request.

2. The print processing system according to claim 1, wherein
    the terminal apparatus generates the print data, in which the bibliographic information is added to actual print data, and transmits the print data to the storage server; and
    the storage server extracts the bibliographic information from the print data obtained from the terminal apparatus and transfers the bibliographic information to the management server.

3. The print processing system according to claim 1, wherein the storage server transfers identification information thereof to the management server, concurrently with the bibliographic information obtained from the terminal apparatus.

4. The print processing system according to claim 1, wherein the storage server causes a user authenticator to perform user authentication, based on user information included in the bibliographic information obtained from the terminal apparatus; and, only when the user authentication is successful, the storage server stores the print data.

5. The print processing system according to claim 4, wherein the storage server rejects storage of new print data, when a threshold associated with print data storage set per user is exceeded when the new print data is transmitted from the printing apparatus.

6. The print processing system according to claim 1, wherein
    the management server retains delete instruction information per document relating to whether or not to delete the print data after printing; and, upon completion of printing of a document to which a delete instruction is provided, the management server provides a delete request of the associated print data, to the storage server storing the print data associated with the document; and
    the storage server, in response to the delete request from the management server, deletes the associated print data from the print data storage of the storage server.

7. The print processing system according to claim 1, wherein, when the storage server detects an error in a process where the print data transmitted from the terminal apparatus is being stored, the storage server deletes the associated print data and provides an error notification to the terminal apparatus transmitting the data.

8. The print processing system according to claim 1, wherein, when detecting an error, the management server provides an error notification to a manager terminal apparatus.

9. The print processing system according to claim 1, wherein
    when detecting an error, the printing apparatus and the storage server provide an error notification to the management server; and
    the management server, in response to the error notification from one of the printing apparatus and the storage server, provides an error notification to the manager terminal apparatus.

10. The print processing system according to claim 1, wherein at least two storage servers are provided for regular and backup use.

11. The print processing system according to claim 1, wherein at least two management servers are provided for regular and backup use.

12. A print processing system in which a storage server temporarily stores print data generated on a terminal apparatus of each user; a printing apparatus that obtains the print data from the storage server and prints the data, according to a user's operation on the printing apparatus; and a management server that manages a storage status of the print data on the storage server; wherein
- the terminal apparatus transmits to the storage server, bibliographic information associated with the print data concurrently when transmitting the data;
- the storage server stores thereon the print data obtained from the terminal apparatus and transfers to the management server, the bibliographic information obtained from the terminal apparatus;
- the management server manages the storage status of the print data on the storage server, based on the bibliographic information obtained from the storage server,
- the printing apparatus obtains user identification information from a user providing a print instruction and inquires the management server for a document associated with the user; and
- the management server searches for a document associated with the user, based on the user identification information obtained from the printing apparatus, and provides the printing apparatus with associated document list information in return.

13. A print processing system in which a storage server temporarily stores print data generated on a terminal apparatus of each user; a printing apparatus then obtains the print data from the storage server and prints the data, according to a user's operation on the printing apparatus; and a management server manages a storage status of the print data on the storage server; wherein
- the printing apparatus provides the management server with a delete request associated with a designated document, according to a delete instruction that a user provides by designating a document;
- the management server, in response to the delete request from the printing apparatus, provides a delete request of the associated print data, to the storage server storing the print data associated with the designated document; and
- the storage server, in response to the delete request from the management server, deletes the associated print data from a print data storage of the storage server.

14. The print processing system according to claim 13, wherein, when the management server receives a notification of print data delete completion from the storage server, the management server deletes the bibliographic information associated with the deleted print data from a bibliographic information storage of the management server.

* * * * *